United States Patent [19]

Colten et al.

[11] 4,275,083

[45] Jun. 23, 1981

[54] GASIFIED CANDY ENROBED WITH OLEAGINOUS MATERIAL

[75] Inventors: Frank P. Colten, Dover, Del.; Joseph J. Halik, Ossining; Robert J. Ravallo, Mahopac, both of N.Y.; Joseph L. Hegadorn, Ridgewood, N.J.; Richard B. Hynson, New Fairfield, Conn.

[73] Assignee: General Foods Corporation, White Plains, N.Y.

[21] Appl. No.: 88,483

[22] Filed: Oct. 26, 1979

[51] Int. Cl.³ .............................................. A23G 3/00
[52] U.S. Cl. ...................................... 426/96; 426/103; 426/613; 426/660
[58] Field of Search ................. 426/96, 103, 572, 660, 426/613

[56] References Cited

U.S. PATENT DOCUMENTS

| | | | |
|---|---|---|---|
| 2,082,313 | 6/1937 | Todd | 426/103 |
| 2,784,096 | 3/1957 | Ciccone | 426/572 |

*Primary Examiner*—Jeanette M. Hunter
*Attorney, Agent, or Firm*—Daniel J. Donovan; B. P. Struzzi; T. R. Savoie

[57] ABSTRACT

A storage-stable confection which does not require moisture resistant packaging is prepared by dispersing granulated gasified candy in a matrix of flavored oleaginous material. Optionally, this confection may be enrobed with a layer of flavored oleaginous material. This confection provides the organoleptic effects of sizzle combined with the taste of fruit, chocolate, peanut butter or carbonated beverage.

31 Claims, No Drawings

GASIFIED CANDY ENROBED WITH OLEAGINOUS MATERIAL

BACKGROUND OF THE INVENTION

1. Field of the Invention

This invention relates to a confection composition. More particularly, it relates to a confection composition which produces the combined organoleptic effects of sizzle and the taste of an oleaginous material. This invention especially relates to a confection of gasified candy admixed and enrobed with an oleaginous material.

2. Description of the Prior Art

Gasified candy is a hard candy containing a gas, such as carbon dioxide, as disclosed in U.S. Pat. Nos. 3,012,893 of Kremzner and Mitchell; 3,985,909 and 3,985,910 of Kirkpatrick and 4,001,457 of Hegadorn which are incorporated herein by reference. Such a candy is made by the process which comprises melting crystalline sugar, contacting such sugar with gas at a pressure of 50 to 1,000 psig for a time sufficient to permit incorporation in said sugar of 0.5 to 15 ml. of gas per gram of sugar, maintaining the temperature of said sugar during said adsorption above the solidification temperature of the melted sugar, and cooling said sugar under pressure to produce a solid amorphous sugar containing the gas. Upon the release of the pressure the solid gasified candy fractures into granules of assorted sizes.

The resultant product contains 1% to 4% water and most typically 2% to 3% water by weight of the total composition. (All percentage figures herein are in terms of weight percent, unless expressly stated otherwise.) Lower levels of moisture are not practicably obtainable because the additional heat necessary to drive off the water causes the candy melt to caramelize or burn, resulting in an off-flavor, undesirable product. Higher moisture levels result in a soft, sticky matrix which rapidly liberates the entrapped gas and is thus not storage stable.

The gasified candy when placed in the mouth produces an entertaining but short-lived popping or sizzling sensation. As the candy is wetted in the mouth the candy melts and the gas escapes. The tingling effect in the mouth is sensational but short.

In order to store the granules of gasified candy, they must be isolated from any source of free water which would soften the candy and allow the trapped gas to escape. Gasified candy, therefore, is packaged in moisture resistant containers, viz., metal foil and plastic laminated sealed envelopes.

It is an object of this invention to provide confection compositions of several components, including gasified candy.

It is another object of this invention to provide gasified candy in a form which will not require moisture resistant packaging.

It is a further object of this invention to provide a confection having prolonged and/or accentuated gasified candy mouthfeel or sensation.

It is still another object of this invention to provide additional confections that provide a variety of sensory effects including a sizzling or popping mouthfeel sensation.

SUMMARY OF THE INVENTION

In accordance with the present invention it has been found that a confection combining the organoleptic effects of sizzle with a fruit, peanut butter, chocolate or carbonated beverage flavor can be prepared by enrobing a core containing granulated gasified candy in a matrix of a flavored oleaginous material. In one embodiment, this invention is directed to a confection which comprises an admixture of an oleaginous material having a fat content of at least 20% and a gasified candy having a particle size distribution of −4 to +40 U.S. Sieve Series, said oleaginous material coating said candy which is homogeneously mixed therein. In another embodiment, a second oleaginous material is applied as an enrobant to the confection.

This invention is also directed to a method of preparing a confection which comprises: (a) admixing gasified candy having a particle size distribution of −4 to +40 U.S. Sieve Series with an oleaginous material having a fat content of at least 20% whereby said oleaginous material coats said candy which is homogeneously mixed therein, and (b) forming the admixture of step (a) into the form of a bar or individual bite size pieces. Optionally, an enrobant of an oleaginous material may be applied to produce an enrobed confection. Oleaginous materials such as chocolate, pastel, compound coating or peanut butter are employed. Further, edible oil, such as coconut oil, palm kernel oil and the like, may be added to the oleaginous material to control texture.

DESCRIPTION OF THE PREFERRED EMBODIMENTS

The present invention relates to a confection which provides a combination or organoleptic effects. The sizzle effect obtained from gasified candy can be combined with a variety of flavors depending on the choice of oleaginous material used in preparing the confection. Chocolate, peanut butter, carbonated beverage or fruit flavor can be combined with the sizzle effect of gasified candy to provide an unusual but pleasant taste sensation.

Although this confection contains gasified candy, moisture resistant packaging of the product is not required to provide storage stability as has been required heretofore with gasified candy.

Briefly, the confection consists of granulated gasified candy suspended in a matrix of oleaginous material and, optionally, enrobed with edible material. Such edible material may include oleaginous material such as chocolate, hard candy coating, edible shellac, waxes and other known confectionary coatings.

The confection of the present invention consists of pieces of gasified candy dispersed in a matrix of an oleaginous material. Optionally, an enrobant of oleaginous material and/or a coating of edible shellac or varnish may be applied to the confection. The oleaginous material and the candy are mixed to form a homogenous mixture where the oleaginous material coats the individual pieces of gasified candy.

The gasified candy component of the instant confection is a hard sugar product having bubbles of gas, such as carbon dioxide, entrapped therein and is conveniently produced according to the process disclosed in U.S. Pat. No. 3,012,893 and discussed hereinbefore.

U.S. Pat. Nos. 3,985,909 and 3,985,910 to Kirkpatrick and U.S. Pat. No. 4,001,457 to Hegadorn disclose additional and/or optional details regarding the process of preparing gasified candy.

The gasified candy can be prepared from any of the commercially-available sugars employed in the confectionary industry. Thus, such sugars as glucose, fructose, sucrose, lactose, etc. alone or in combination may be employed in practicing the instant invention. A combination of sucrose and lactose provides a preferred product. A mixture of 52 percent sucrose, 27 percent lactose and 21 percent corn syrup provides an excellent gasified hard product particularly characterized by its good gas retention and reduced stickiness on standing. The moisture content of the gasified candy is typically between 1.0 and 4.0%. Preferably, it is between 2.0 and 3.0%. Gasified candy pieces in a variety of sizes may be employed, although it is preferred that the pieces be sieved to produce uniform sized pieces and thus facilitate the preparation of the confection. Gasified candy fines, typically −4 to +40 U.S. Sieve Series can be employed but a particle size range of −20 to +40 U.S. Sieve Series is preferred. The gasified candy comprises 2–40% of the confection with a range of 5–15% being preferred and 7.5% being especially preferred. In general, the lower percentage concentration of the gasified candy produces the preferred mouthfeel, particularly with a chocolate oleaginous material. As to the sensation from the gasified candy, the larger particles in general produce more of a "popping" sensation while the smaller particles generally provide more of a "sizzling" sensation. The generally preferred combination is a confection having a lower percentage concentration of small particle size gasified candy. However, where it is desired to prepare a "fad" confection which delivers a pronounced sizzling effect in a pleasing way, a high concentration of gasified candy should be incorporated into the confection. In such a product the gasified candy can comprise 15–40% of the confection.

The oleaginous material admixed with the gasified candy in the core consists of an edible oleaginous material such as chocolate, pastel or peanut butter. The oleaginous material of the enrobant does not require the use of the edible oil and consists of chocolate or pastel. Peanut butter usually does not form a hard enough surface to serve as an enrobant. The fat level of the oleaginous material should be 20% or more, with 25–45% being preferred.

The chocolate employed may be either sweet chocolate or milk chocolate. Sweet chocolate is chocolate liquor to which sugar and cocoa butter have been added. Milk chocolate contains these same three ingredients plus milk or milk solids. Sweet chocolate is available as sweet, semisweet or bittersweet chocolate. The chocolate employed here typically contains about 25–45% fat and has a moisture content of about 2.5% or below, more particularly about 1–2% or below.

Appropriate flavoring may be added to the chocolate where a flavored product, such as mint chocolate, is desired.

Pastel is employed in the confectionary industry in many of the instances where chocolate is employed. It has a texture similar to chocolate and provides substantially the same mouthfeel when eaten. Its composition is similar to sweet chocolate except that milk or milk solids are substituted for the chocolate liquor and other edible fats substituted for the cocoa butter. Its fat content and moisture content are typically similar to chocolate. Pastel is employed in the present invention to prepare confections with a fruit color and taste by incorporating appropriate colorings and flavorings. By selecting commercially-available products, and incorporating them into the pastel, confections with such flavors as orange, strawberry, cherry, lemon-lime, carbonated beverage flavor, such as cola and the like may be prepared.

Peanut butter may also be employed in the oleaginous material admixed with the gasified candy. This familiar and commercially-available product is a paste made by grinding roasted, skinned and degermed peanuts. Often, preservatives, additional vegetable oil and additives to provide a creamy and easily-spreadable product are incorporated with the ground peanuts. Peanut butter has a moisture content of about 1–2% or below. Peanut butter matrixes such as commercially available peanut butter coating are preferred.

A quantity of edible oil, such as a vegetable oil, may be mixed with the chocolate, pastel or peanut butter coating to provide a softer oleaginous material which is admixed with the gasified candy. Vegetable oils such as coconut, olive, peanut, corn, cottonseed, soybean, palm kernel oil or the like may be employed but coconut oil is preferred. The vegetable oil serves to reduce somewhat the viscosity of the oleaginous material with which the granulated gasified candy is admixed so that the mixture can be "worked" and produce a homogeneous mixture where the oleaginous material provides a coating around the individual granules of gasified candy. In addition, the oil produces a final mixture which can be more readily formed into the shape of drops or bars as required for the final product.

The oleaginous material of the enrobant also uses chocolate or pastel as described hereinbefore. However, edible oil is not required in the enrobant since it provides a stable, semi-hard vapor barrier for the core which contains the hygroscopic gasified candy. The enrobant also provides an important cosmetic effect in covering the rough surfaces caused by the presence of gasified candy and in preventing the loss of gas from the gasified candy.

Both of the oleaginous materials, that used in the core and that comprising the enrobant, should have a moisture content below that of the gasified candy. Therefore, it should be below 2.5%, preferably 1–2% or below for each of the oleaginous materials.

The confection of the present invention can be prepared in a variety of sizes and shapes. Since conventional candy-making equipment may be employed to produce this confection, it is convenient to prepare, for example, drop sized pieces, sized 15 pieces to the ounce, or a bar in a one ounce size.

The confection may be prepared in drop form as follows:

Chocolate, pastel or peanut butter is melted in a vessel. Coconut oil is added to provide the required consistency and the mixture is agitated. Coloring, flavoring and additives, if any, are added as required and the mixing is continued until a uniform blend is obtained. The blend is cooled to below 100° F., tempered, if desired, the develop the fat structure of the cocoa butter products, as is known in the art, and the gasified candy fines are added. Mixing is continued until a homogeneous mixture is obtained wherein the gasified candy particles are coated with the oleaginous material. The blend is then introduced into a confectionary machine, known as a drop depositor, which forms the mixture into drops of uniform size. Then these drops are cooled and equilibrated. Each drop is coated with a layer of chocolate or appropriately colored and flavored pastel by hand or in a mechanical enrober. The final product passes through a cooling tunnel to solidify the enrobant and is then packaged.

Bars of the confection may be prepared as follows:

The mixture of oleaginous material and gasified candy is prepared as in the procedure used for preparing the confection in drop sized pieces. Then the mixture is poured out on a table with height adjusted borders, cooled, cut into bar-sized pieces and after equilibrium is attained, enrobed in a manner similar to that employed for the enrobed drops.

Where it is desired to produce a confection of granulated gasified candy dispersed in a matrix of oleaginous material, i.e., without an outer enrobant of oleaginous material, those skilled in the art can appreciate that the above described procedure can be readily modified to produce such a confection by the simple expedient of eliminating the enrobing step.

A chocolate bar without the optional enrobant may be prepared in accordance with the present invention as follows:

Milk chocolate is melted in a vessel, cooled to 100° F. and tempered to develop the proper fat structure within the chocolate. Finely divided pieces of gasified candy are added to the vessel and the contents are mixed until a homogeneous mixture of chocolate and gasified candy is obtained. The contents of the vessel are molded into individual bars of confection and permitted to cool. Following demolding of the bars, they are packaged, as desired.

A number of formulations which permit the preparation of a variety of enrobed drops, enrobed bars and plain bars in accordance with the instant invention are set forth below. Those skilled in the art will appreciate that confections in other flavors may also be prepared in accordance with the present invention by employing appropriate colorings, flavorings and materials which are commercially-available.

I. FRUIT PIECES
Size = 15 pieces/ounce
Shape = Drop

A. Orange:

| Center: | Ingredient | % |
|---|---|---|
| | Gasified Candy Fines (−20+40 U.S. Sieve Series) | 10.0000 |
| | Coconut Oil | 9.0000 |
| | Commercial Yellow Coloring | 0.3321 |
| | Commercial Orange Flavor | 0.0810 |
| | Powdered Anhydrous Citric Acid | 0.0162 |
| | Commercial Pastel Coating | Balance |
| | | 100.0000 |
| | Center is 75% of Piece: | 75.0 % of whole |

| Enrobant: | Ingredient | % |
|---|---|---|
| | Commercial Yellow Coloring | 0.4100 |
| | Commercial Orange Flavor | 0.1000 |
| | Powdered Anhydrous Citric Acid | 0.0200 |
| | Commercial Pastel Coating | Balance |
| | | 100.0000 |
| | Enrobant is 25% of Piece: | 25.0 % of whole |

B. Strawberry:

| Center: | Ingredient | % |
|---|---|---|
| | Gasified Candy Fines (−20+40 U.S. Sieve Series) | 10.0000 |
| | Coconut Oil | 9.0000 |
| | Commercial Red Coloring | 0.1381 |
| | Powdered Anhydrous Citric Acid | 0.0654 |
| | Commercial Strawberry Flavor | 0.0122 |
| | Commercial Pastel Coating | Balance |
| | | 100.0000 |
| | Center is 75% of piece: | 75.0 % of whole |

| Enrobant: | Ingredient | % |
|---|---|---|
| | Commercial Red Coloring | 0.1705 |
| | Powdered Anhydrous Citric Acid | 0.0808 |
| | Commercial Strawberry Flavor | 0.0150 |
| | Commercial Pastel Coating | Balance |
| | | 100.0000 |
| | Enrobant is 25% of piece: | 25.0 % of whole |

C. Lemon and Lime:

| Center: | Ingredient | % |
|---|---|---|
| | Gasified Candy Fines (−20+40 U.S. Sieve Series) | 10.0000 |
| | Coconut Oil | 9.0000 |
| | Commercial Lemon-Lime Flavor | 0.0607 |
| | Powdered Anhydrous Citric Acid | 0.0404 |
| | Commercial Yellow Coloring | 0.0233 |
| | Commercial Pastel Coating | |

|  |  |  |
|---|---|---|
|  | (No Vanilla) | Balance |
|  |  | 100.0000 |
|  | Center is 75% of piece: | 75.0 |
|  |  | % of whole |

| Enrobant: | Ingredient | % |
|---|---|---|
|  | Commercial Lemon-Lime Flavor | 0.0749 |
|  | Powdered Anhydrous Citric Acid | 0.0499 |
|  | Commercial Yellow Coloring | 0.0288 |
|  | Commercial Pastel Coating |  |
|  | (No Vanilla) | Balance |
|  |  | 100.0000 |
|  | Enrobant is 25% of piece: | 25.0 |
|  |  | % of whole |

II. PEANUT BUTTER PIECE
Size = 15 pieces/ounce
Shape = Drop

| Center: | Ingredient | % |
|---|---|---|
|  | Commercial Peanut Butter Coating | 81.0 |
|  | Gasified Candy Fines |  |
|  | (−20+40 U.S. Sieve Series) | 10.0 |
|  | Coconut Oil | 9.0 |
|  |  | 100.0 |
|  | Center is 75% of piece | 75.0 |
|  |  | % of whole |

| Enrobant: | Ingredient | % |
|---|---|---|
|  | Commercial Milk Chocolate Coating | 100.0 |
|  | Enrobant is 25% of piece: | 25.0 |
|  |  | % of whole |

III. CHOCOLATE PIECE
Size 15 pieces/ounce
Shape = Drop

| Center: | Ingredient | % |
|---|---|---|
|  | Commercial Milk Chocolate Coating | 81.0 |
|  | Gasified Candy Fines |  |
|  | (−20+40 U.S. Sieve Series) | 10.0 |
|  | Coconut Oil | 9.0 |
|  |  | 100.0 |
|  | Center is 75% of piece: | 75.0 |
|  |  | % of whole |

| Enrobant: | Ingredient | % |
|---|---|---|
|  | Commercial Milk Chocolate Coating | 100.0 |
|  | Enrobant is 25% of piece: | 25.0 |
|  |  | % of whole |

IV. MINT CHOCOLATE PIECE
Size 15 pieces/ounce
Shape = Drop

| Center: | Ingredient | % |
|---|---|---|
|  | Gasified Candy Fines |  |
|  | (−20+40 U.S. Sieve Series) | 10.000 |
|  | Coconut Oil | 9.000 |
|  | Commercial Peppermint Oil | 0.081 |
|  | Commercial Milk Chocolate Coating | Balance |
|  |  | 100.000 |
|  | Center is 75% of piece: | 75.0 |
|  |  | % of whole |

| Enrobant: | Ingredient | % |
|---|---|---|
|  | Commercial Milk Chocolate Coating | 100.000 |
|  | Enrobant is 25% of piece: | 25.0 |
|  |  | % of whole |

V. CHOCOLATE BAR
Size = one ounce

| Center: | Ingredient | % |
|---|---|---|
|  | Commercial Milk Chocolate | 83.7 |
|  | Coconut Oil | 9.3 |
|  | Gasified Candy Fines |  |
|  | (−20+40 U.S. Sieve Series) | 7.0 |
|  |  | 100.0 |
|  | Center is 75% of bar: | 75.0 |
|  |  | % of whole |

| Enrobant: | Ingredient | % |
|---|---|---|
|  | Commercial Milk Chocolate Coating | 100.0 |

| -continued | | |
|---|---|---|
| | Enrobant is 25% of bar: | 25.0 |
| | | % of whole |
| VI. PEANUT BUTTER BAR | | |
| Size = one ounce Center: | Ingredient | % |
| | Commercial Peanut Butter Coating | 81.0 |
| | Coconut Oil | 9.0 |
| | Gasified Candy Fines | |
| | (−20+40 U.S. Sieve Series) | 10.0 |
| | | 100.0 |
| | Center is 75% of bar: | 75.0 |
| | | % of whole |
| Enrobant: | Ingredient | % |
| | Commercial Milk Chocolate Coating | 100.0 |
| | Enrobant is 25% of bar: | 25.0 |
| | | % of whole |
| VII. PLAIN CHOCOLATE BAR (NO ENROBANT) | | % |
| | Commercial Milk Chocolate | 90 |
| | Gasified Candy fines | 10 |
| | (−20+40 U.S. Sieve Series) | 100 |

Other known candy additions such as cereals, fruits, nuts, nougats, coconut and the like can be added to the products of this invention taking care to either adjust their moisture content or coat the additive with, for example, sugar to prevent swelling of the gasified candy.

The gases used to prepare the gasified candy of the present invention may be carbon dioxide, nitrogen or air but carbon dioxide is preferred. The gas is entrapped within the solidified candy under superatmospheric pressure. The gasified sugar contains 0.5 to 15, preferably 2 to 7, $cm^3$ of gas per gram of candy.

Particularly preferred is candy prepared using 2-15% gasified confection having a particle size range of through at least a 12 mesh screen or more, preferably through 20 and on 40 mesh U.S. Sieve Series.

The confections of this invention were evaluated, along with a popular commercial brand of chocolate in a central location test conducted at a number of shopping malls located in metropolitan areas throughout the United States.

Two chocolate confections of this invention, designated, Bar A and Bar B, were tested. The composition of these chocolate bars is set forth in Table I below:

TABLE I

| | Bar A % | Bar B % |
|---|---|---|
| Center (75% of bar) | | |
| Commercial milk chocolate | 81 | 82.35 |
| Coconut oil | 9 | 9.15 |
| Gasified ($CO_2$) candy | 10 | 8.50 |
| (−10+40 U.S. Sieve Series) | | |
| | 100 | 100.00 |
| Enrobant (25% of bar) | | |
| Commercial milk chocolate | 100 | 100 |

The enrobed bars were prepared as follows:

The milk chocolate was melted at a temperature of 150° F. and the coconut oil was blended into it. The mixture was allowed to cool to 90° F. at which point the gasified candy was added and blended in. The gasified candy had been prepared with carbon dioxide and will therefore be referred to hereafter as "carbonated candy". The 90° F. density of each blend was 1.3 g/$cm^3$.

Bar B was then mixed at high speed in a Hobart paddle mixer at a temperature of 87° F. This mixing, termed the whipping step, increased the volume of the blend by incorporating air into the blend and was continued until the desired "overrun" was obtained. "Overrun" is expressed as the percentage increase in volume of the blend. Bar B was whipped to a 25% overrun producing a 90° F. density of 1.3/1.25 or 1.04 g/$cm^3$. The whipped and non-whipped mixtures were formed into bars and enrobed with a coating of milk chocolate.

The central location taste tests were conducted in four geographically dispersed cities among 299 children, between the ages of 9 and 16, who had eaten a carbonated candy in the past six months and who were not allergic to chocolate.

Respondents were given a chocolate bar to taste and then asked their overall rating, purchase intent and directional ratings. They were given a second chocolate bar to try and then asked overall attribute and directional preferences. Order of presentation was rotated to minimize position bias.

Evaluations yielded 100 respondents per chocolate bar under test. Paired data were analyzed. Each possible pairing was tested by a separate sample of respondents. While only 100 respondents actually tested each pair, the resultant pairwise precision was 150 per cell.

The summary of the findings are listed in Table II below.

TABLE II

| Bar A | = Non-whipped carbonated candy chocolate bar. |
| Bar B | = Whipped carbonated candy chocolate bar. |
| Commercial | = Popular commercial bar of milk chocolate. |

| | Non-Whipped vs. Whipped | | Commercial vs. Non-Whipped Variant | | Commercial vs. Whipped Variant | |
|---|---|---|---|---|---|---|
| | Prefer Non-Whipped Carbonated Variant % | Prefer Whipped Variant % | Prefer Commercial % | Prefer Non-Whipped Carbonated Variant % | Prefer Commercial % | Prefer Whipped Variant % |
| Estimated Precision = 150 Per Cell Overall Preference | 57* | 43 | 35 | [65] | 42 | 58* |

[ ] - Significantly preferred at least at the 95% level of confidence (two-tailed test).
*Significantly preferred at least at the 80% level of confidence (two-tailed test).
The commercial chocolate bars employed in this evaluation were Hershey™ chocolate.

On a monadic basis, no significant differences were noted overall between the three chocolate bars tested. However, on the basis of paired testing, the data show that both of the carbonated chocolate bars of this invention were preferred over the commercial chocolate bar. Additionally, the non-whipped carbonated chocolate bar was preferred over both the whipped carbonated chocolate bar and the commercial chocolate bar.

The results of the overall attribute and directional preferences are summarized below in Table III.

Further evaluation of the present chocolate candy compositions by taste panels clearly demonstrates that the carbonated chocolate candy is more acceptable than non-carbonated, commercially-available chocolate candy. Preferably, the level of carbonated candy added to the chocolate composition is less than about 15 wt. % based on the chocolate.

Carbonated candy sustains a sizable preference margin over non-carbonated prototypes among both boys and girls and across both younger (11–13) and older

TABLE III

| Base: Estimated Precision = 150 per cell | Commercial vs. Non-Whipped/Carbonated Variant | | Commercial vs. Whipped Variant | | Non-Whipped/Carbonated Variant vs. Whipped Variant | |
|---|---|---|---|---|---|---|
| | Prefer Commercial | Prefer Non-Whipped/Carbonated Variant | Prefer Commercial | Prefer Whipped Variant | Prefer Non-Whipped/Carbonated Variant | Prefer Whipped Variant |
| Overall | 35 | [65] | 42 | 58* | 57* | 43 |
| Having the right strength of flavor | 41 | [59] | 49 | 51 | [58] | 42 |
| Being fun to eat | 18 | [82] | 23 | [77] | 57* | 43 |
| Leaving a better aftertaste | 40 | [60] | 48 | 52 | 58* | 42 |
| Having the sizzle last the right amount of time | 10 | [90] | 16 | [84] | [64] | 36 |
| Having an immediate flavor release | 52 | 48 | 56* | 44 | 55 | 45 |
| Having the right texture when eating it | 53 | 47 | 48 | 52 | 45 | 55 |
| Having a longer lasting flavor | 41 | [59] | 50 | 50 | [59] | 41 |
| Having the right amount of softness | 56* | 44 | 47 | 53 | 41 | [59] |
| Melting in your mouth | [62] | 38 | 51 | 49 | 39 | [61] |
| Leaving a pleasant feeling all over your mouth | 32 | [68] | 39 | [61] | 57* | 43 |
| Having the right amount of sweetness | 43 | 57* | 46 | 54 | 53 | 47 |
| Being a less filling candy | 57* | 43 | 55 | 45 | 48 | 52 |
| Having the right amount of sizzle | 13 | [87] | 17 | [83] | [59] | 41 |

[ ] - Significantly preferred within the cell at least at the 95% level of confidence (two-tailed test)
*Significantly preferred within the cell at least at the 80% level of confidence (two-tailed test)
The commercial chocolate bars employed in this evaluation were Hershey™ chocolate.

The foregoing data show the striking effect of the carbonated candy on the chocolate candy bars tested. (14–16) age groups as shown in Table IV.

TABLE IV

| | Chocolate Peanut Butter | | Chocolate | |
|---|---|---|---|---|
| | 30% Carb. Soft-Med. Prefer 30% Carb. Soft-Med. | vs. 0% Carb. Soft-Med. Prefer 0% Carb. Soft-Med. | 15% Carb. Soft-Med. Prefer 15% Carb. Soft-Med. | 0% Carb. Soft-Med. Prefer 0% Carb. Soft-Med. |
| | (Base:) % | % | (Base:) % | % |
| Total | (99) 62+ | 35 | (105) 65+ | 33 |
| Males | (50) 60+ | 36 | (53) 62+ | 36 |
| Females | (49) 63+ | 35 | (52) 67+ | 29 |
| 11–13 | (50) 66+ | 30 | (55) 73+ | 24 |
| 14–16 | (49) 57 | 41 | (50) 56 | 42 |

+Statistically significant at 90% confidence level or higher (two-tailed test).

Monadic evaluations show that carbonated candy bars clearly gain greater receptivity among both boys and girls (aged 11–16 years) than non-carbonated candy bars as shown in Table V.

TABLE V

| | Definite Purchase Interest | Excellent | Excellent/ Extremely Good |
|---|---|---|---|
| | (Base:) % | % | % |
| Chocolate Peanut Bars | | | |
| 15% soft/medium | (196) 31+ | 26+ | 48+ |
| 30% soft/medium | (200) 30+ | 25+ | 41 |
| 0% soft/medium | (99) 19 | 13 | 33 |
| Chocolate Bars | | | |
| 15% soft/medium | (206) 37+ | 25 | 54+ |
| 0% soft/medium | (105) 23 | 19 | 39 |

+Significantly greater than 90% level of confidence or higher (two-tailed test).

The effects of sizzling on flavor were monadically evaluated with the results as shown in Table VI.

TABLE VI

| | PRODUCT TRIED: | | | | |
|---|---|---|---|---|---|
| | Chocolate Peanut Butter Bar | | | Chocolate Bar | |
| | 15% Soft (A) (47) % | 15% Soft/ Med (C) (97) % | 30% Soft/ Med (D) (150) % | 15% Soft/ Med (F) (152) % | 15% Hard (G) (49) % |
| Positive (Net) | 51 | 57 | 59 | 61 | 74 |
| Taste (Net) | 34 | 42 | 43 | 47 | 59 |
| Makes it taste better | 9 | 14 | 15 | 15 | 14 |
| Brings out the flavor | 9 | 6 | 7 | 9 | 16 |
| Gives it more/stronger flavor | 6 | 9 | 5 | 5 | 10 |
| Flavor lasts longer | — | 3 | 3 | 5 | 2 |
| Chocolate (Sub-Net) | 2 | 2 | 4 | 5 | 14 |
| Brings out chocolate flavor | 2 | 2 | 3 | 5 | 10 |
| Peanut Butter (Sub-Net) | 2 | 4 | 5 | NA | NA |
| Sensation (Net) | 23 | 22 | 15 | 12 | 22 |
| Made it pop/crackle | 6 | 16 | 7 | 7 | 6 |
| Made it sizzle | 11 | 3 | 3 | 5 | 12 |
| Feels good/better | 2 | 1 | 5 | 1 | 4 |
| Texture (Net) | — | 5 | 3 | 5 | 4 |
| Miscellaneous | | | | | |
| It's fun | 2 | 1 | 5 | 3 | 4 |
| It's different | 6 | 2 | 3 | 1 | 6 |
| Neutral (Net) | 36 | 28 | 31 | 27 | 22 |
| It doesn't change flavor | 36 | 28 | 30 | 27 | 22 |
| Negative (Net) | 19 | 14 | 17 | 16 | 8 |
| Detracts from taste | 9 | 8 | 8 | 6 | 2 |
| All you feel is the popping | 2 | 2 | 5 | 3 | — |

Tables IV, V and VI present test results for candy bars having the following general descriptions:

Peanut Butter-Carbonated Candy Enrobed with Milk Chocolate

| Sample | Description of Center |
|---|---|
| A | Soft texture, 15% carbonated candy |
| B | Soft-medium texture, 0% carbonated candy |
| C | Soft-medium texture, 15% carbonated candy |
| D | Soft-medium texture, 30% carbonated candy |

Chocolate-Carbonated Candy Enrobed with Milk Chocolate

| Sample | Description of Center |
|---|---|
| E | Soft-medium texture, 0% carbonated candy |
| F | Soft-medium texture, 15% carbonated candy |
| G | Hard texture, 15% carbonated candy |

These candy bars had the following composition:

Peanut Butter-Carbonated Candy/Chocolate Enrobant

| | Sample Composition, % | | | |
|---|---|---|---|---|
| Ingredient | A | B | C | D |
| Center: (71% of bar) | | | | |
| Commercial Peanut Butter | 85 | 60 | 51 | 42 |
| Commercial Pastel Coating | 0 | 40 | 34 | 28 |
| Carbonated Candy (−12 +30 U.S. Sieve Series) | 15 | 0 | 15 | 30 |
| | 100 | 100 | 100 | 100 |
| Enrobant: (29% of bar) | | | | |
| Commercial Milk Chocolate | 100 | 100 | 100 | 100 |

Chocolate-Carbonated Candy/Chocolate Enrobant

| | Sample Composition, % | | |
|---|---|---|---|
| Ingredient | E | F | G |
| Center: (71% of bar) | | | |

-continued

| | | | |
|---|---|---|---|
| Commercial Imitation Chocolate | 75 | 63.7 | — |
| Commercial Milk Chocolate | — | — | 85 |
| Edible Oil | 25 | 21.3 | 0 |
| Carbonated Candy (−12 +30 U.S. Sieve Series) | 0 | 15.0 | 15 |
| | 100 | 100.0 | 100 |
| Enrobant: (29% of bar) | | | |
| Commercial Milk Chocolate | 100 | 100 | 100 |

The general procedure used to prepare these test candy bars is set forth below. It will be appreciated that appropriate adjustments were made because of the composition of the particular candy bar being prepared.

The candy base for the center of the bar was melted in a stirred vessel at a temperature below 140° F. After the candy base (peanut butter, pastel coating, chocolate) was melted and the edible oil was added, where required, it was cooled to 95° F. and the carbonated candy was blended in. The mixture was poured into bar molds (approximately 1¼"×3"×⅜") and cooled until solidified. The bars were removed from the mold, enrobed with milk chocolate and packaged in metal foil.

Packaging the confection of this invention does not require the use of moisture resistant materials as does gasified candy. Although there is a significant amount of water present in the confection, surprisingly the gasified candy remains stable. This, despite the fact that the oleaginous material in the core and the enrobant may contain 1-2% water while 2-3% water may be present in the gasified candy itself. The oleaginous material in the core and the enrobant apparently forms a barrier preventing water from reaching the hydrophilic gasified candy which would otherwise cause it to become sticky and lose the entrapped carbon dioxide. Therefore, paper packaging well known in the candy art can be employed. The form of the confection will determine the exact nature of the wrapping—quantities of small drops may be packaged in bags of clear plastic or waxed paper while the larger bars of the confection may be wrapped individually in similar materials.

The confection of this invention provides the candy lover with a pleasing combination of organoleptic effects—sizzle plus a fruity, a peanut butter or a chocolate flavor. The combination of these distinctive effects is most pleasing, pleasant and unusual and is quite unlike that of any other candy or confection. By permitting the confection to dissolve in the mouth, a sustained popping or sizzling is produced as the melting oleaginous material gradually exposes the gasified candy to the moisture in the mouth. Surprisingly, this tingling effect is significantly more prolonged than that which is experienced when gasified candy is placed in the mouth.

What is claimed is:

1. A confection which comprises: an admixture of oleaginous material selected from the group consisting of chocolate, pastel, compound coating and peanut butter having a fat content of at least 20% and a gasified candy having a sizzling and/or popping sensation when eaten, having a particle size distribution of −4 to +40 U.S. Sieve Series, having moisture content of 1-4% water and having 2 to 7 cm$^3$ of carbon dioxide gas per gram of candy, wherein said oleaginous material coats said candy which comprises 2-40% of the confection and is homogenously mixed therein.

2. A confection according to claim 1 wherein the oleaginous material has a fat content of 25-40%.

3. A confection according to claim 1 wherein the gasified candy comprises 5-15% of the confection.

4. A confection according to claim 1 wherein the gasified candy comprises 15-40% of the confection.

5. A confection according to claim 1 wherein the gasified candy has a particle size distribution of −20 to +40 U.S. Sieve Series.

6. A confection according to claim 1 wherein the gas in the gasified candy is carbon dioxide.

7. A confection according to claim 1 wherein the oleaginous material additionally comprises an edible oil.

8. A confection according to claim 7 wherein the edible oil is coconut oil.

9. A confection according to claim 1 wherein the pastel is additionally admixed with coloring and flavoring.

10. A confection according to claim 1 wherein the chocolate is additionally admixed with flavoring.

11. A confection according to claim 1 wherein the chocolate is sweet, semi-sweet, bittersweet or milk chocolate.

12. A confection according to claim 1 wherein said confection has a second oleaginous material formed on its outer surface as an enrobant.

13. A confection according to claim 12 wherein the second oleaginous material is chocolate or pastel.

14. A confection according to claim 13 wherein the pastel is additionally admixed with coloring and flavoring.

15. A confection according to claim 13 wherein the chocolate is additionally admixed with flavoring.

16. A confection according to claim 13 wherein the chocolate is sweet, semi-sweet, bittersweet or milk chocolate.

17. A confection according to claim 1 wherein the moisture content of the gasified candy is 2-3% and of the oleaginous material is 1-2%.

18. A confection according to claim 1 wherein said confection has a layer of edible shellac or varnish formed on its outer surface.

19. A method of preparing a confection which comprises:
(a) admixing gasified, hard candy having a sizzling and/or popping sensation when eaten, having a particle size distribution of −4 to +40 U.S. Sieve Series, having a moisture content of 1-4% water and having 2-7 cm$^3$ of carbon dioxide gas per gram of candy, with an oleaginous material selected from the group consisting of chocolate, pastel, compound coating and peanut butter, having a fat content of at least 20% whereby said oleaginous material coats said candy which comprises 2-40% of the confection and is homogenously mixed therein; and
(b) forming the admixture of step (a) into the form of a bar or individual bite size pieces.

20. A method according to claim 19 wherein the oleaginous material has a fat content of 25-45%.

21. A method according to claim 19 wherein the gasified candy comprises 5-15% of the confection.

22. A method according to claim 19 wherein the gasified candy comprises 15-40% of the confection.

23. A method according to claim 19 wherein the gasified candy has a particle size distribution of −20 to +40 U.S. Sieve Series.

24. A method according to claim 19 wherein the gas in the gasified candy is carbon dioxide.

25. A method according to claim 19 wherein edible oil is admixed with the oleaginous material of step (a).

26. A method according to claim 25 wherein the edible oil is coconut oil.

27. A method according to claim 19 wherein coloring and flavoring is additionally admixed with the pastel of step (a).

28. A method according to claim 19 wherein flavoring is additionally admixed with the chocolate of step (a).

29. A method according to claim 21 wherein the chocolate of step (a) is sweet, semi-sweet, bittersweet or milk chocolate.

30. A method according to claim 19 wherein the moisture content of the gasified candy is 2-3% and of the oleaginous material is 1-2%.

31. A method according to claim 19 including the following additional step:
   forming a layer of oleaginous material, edible shellac or varnish on the outer surface of the confection.

* * * * *